United States Patent
Conway (10) Patent No.: US 7,472,399 B2
(45) Date of Patent: Dec. 30, 2008

(54) METHOD AND SYSTEM FOR A CLIENT INVOKING ON AN INTERFACE DEFINED IN A FIRST NOTATION TO INVOKE AN OBJECT HAVING AN INTERFACE DEFINED IN A SECOND NOTATION

(75) Inventor: Alan Conway, Magog (CA)

(73) Assignee: IONA Technologies, PLC, Dublin (IE)

( * ) Notice: Subject to any disclaimer, the term of this patent is extended or adjusted under 35 U.S.C. 154(b) by 478 days.

(21) Appl. No.: 10/133,849

(22) Filed: Apr. 25, 2002

(65) Prior Publication Data
US 2003/0014556 A1    Jan. 16, 2003

Related U.S. Application Data

(60) Provisional application No. 60/295,351, filed on Jun. 2, 2001, provisional application No. 60/286,640, filed on Apr. 26, 2001, provisional application No. 60/286,641, filed on Apr. 26, 2001.

(51) Int. Cl.
G06F 3/00     (2006.01)
G06F 9/44     (2006.01)
G06F 9/46     (2006.01)
G06F 13/00    (2006.01)
G06F 9/45     (2006.01)

(52) U.S. Cl. ............... 719/330; 719/313; 719/315; 717/136; 717/137

(58) Field of Classification Search ......... 719/311–332, 719/310; 707/103 R, 136–139; 718/104; 717/136–139
See application file for complete search history.

(56) References Cited

U.S. PATENT DOCUMENTS

| | | | | |
|---|---|---|---|---|
| 5,956,507 A | * | 9/1999 | Shearer et al. | 718/104 |
| 6,066,181 A | * | 5/2000 | DeMaster | 717/148 |
| 6,314,429 B1 | * | 11/2001 | Simser | 707/103 R |
| 6,775,822 B1 | * | 8/2004 | Apte et al. | 717/120 |
| 2002/0095521 A1 | * | 7/2002 | Blaukopf et al. | 709/310 |

OTHER PUBLICATIONS

"Java Langugage to IDL Mapping Specification," Jun. 1999, Object Management Group, pp. 1-60.*
"IDL to Java Language Mapping Specification," Jun. 1999, Object Management Group, pp. 1-130.*
Gokhale, et al., "Software Tools For Automating the Migration From DCE to CORBA," 1997, IEEE Toronto, pp. 1-13.*

* cited by examiner

*Primary Examiner*—Meng-Ai An
*Assistant Examiner*—Qing-Yuan Wu
(74) *Attorney, Agent, or Firm*—IP Authority, LLC; Ramraj Soundararajan (57) ABSTRACT

A method and system for a client invoking on an interface defined in a first notation to invoke an object having an interface defined in a second notation is disclosed. In one aspect, the method comprises the steps of: automatically generating an intermediate object that receives a first message from a first object; the message representing at least one data structure; the at least one data structure comprising at least one dynamic data type; the intermediate object converting the representation of the at least one data structure and at least one data type into a representation of at least one statically defined data structure; the intermediate object sending a second message to a second object; the second message comprising the representation of the at least one statically defined data structure. In one preferred embodiment, the method and system facilitate communication between CORBA and Java EJB objects.

12 Claims, 1 Drawing Sheet

FIGURE 1

METHOD AND SYSTEM FOR A CLIENT INVOKING ON AN INTERFACE DEFINED IN A FIRST NOTATION TO INVOKE AN OBJECT HAVING AN INTERFACE DEFINED IN A SECOND NOTATION

Priority of U.S. provisional application No. 60/295,351 filed on Jun. 2, 2001 by Alan Conway, entitled "CORBA/EJB INTEROPERABILITY SYSTEM AND METHOD," U.S. provisional application No. 60/286,640 filed on Apr. 26, 2001 by Alan Conway, entitled "ENTERPRISE APPLICATION SERVER," and U.S. provisional application No. 60/286,641 filed on Apr. 26, 2001 by Alan Conway, entitled "SYSTEM AND METHOD FOR INTEGRATING COMMON OBJECT REQUEST BROKER ARCHITECTURE AND ENTERPRISE JAVA BEANS," is claimed under 35 U.S.C. § 119. Each of the foregoing applications is incorporated herein by reference in its entirety.

FIELD OF THE INVENTION

The field of the present invention pertains generally to the integration of software systems for requesting and providing services between software objects defined in different notations, such as different programming languages or different interface definition languages. In one example preferred embodiment, the present invention pertains to interoperability between Enterprise Java Bean (EJB) objects and CORBA objects.

BACKGROUND OF THE INVENTION

Middleware systems are often used to support integration and interoperation of software programs having interfaces defined in a number of different notations. Notations for interface definition may take the form of a full-fledged programming language, such as Java, C++, ML, Lisp, etc., or may be special-purpose notations specifically for defining interfaces which may lack logic and other constructs necessary to fully define an executable program, such as CORBA Interface Definition Language (CORBA IDL).

Interoperation between software programs having interfaces defined in different notations requires the ability to define one or more interfaces in one notation for software programs having interfaces defined in another notation, so that a program may invoke an interface defined in the first notation to request and receive services of programs through interfaces defined in a second notation. Thus, for example, a C++ program may invoke a CORBA IDL interface that in turn causes a Java interface of a Java program to be invoked and provide services in response to the request of the C++ program.

Since different notations have different syntaxes and semantics, and vary considerably in their expressive power and built-in structures and functions, mapping interfaces defined in one notation to another is not always a straightforward matter. In particular, defining a generalized mapping of all interfaces definable in a first notation to interfaces in a second notation often results in cumbersome and unwieldy interfaces when the mapping is applied to interfaces commonly encountered in practice. For example, a simple interface in the first notation may map to a very complex interface in the second.

Certain differences in the treatment of data types exemplify this problem. Many notations differ in their treatment of specific data types with respect to run-time type checking versus compile-time type checking. For example, the Java data type java.util.Vector is commonly used as a parameter in an invocation or response to an invocation. Vector implements an array of objects which may be of any type, meaning that type definitions of the contents of a Vector are not required when the Vector is declared at compile-time. CORBA IDL does not include a similar array, but does include a sequence data type, which is similar in many respects to Vector, but requires compile-time type definition of its members. In many applications in which a Vector is used to pass an array of data all of the same type, it would be natural to map the Vector to a CORBA IDL sequence. However, because the Java program does not specify the data types of the members at compile-time (even though the programmer knows that they will always be of the same type), it is difficult to automate the mapping of the Vector to CORBA IDL sequence. As described in more detail below, in part to accommodate the weak typing of Vector, the Object Management Group Java-to-CORBA IDL mapping does not map Vector to IDL sequence, but uses a far more cumbersome mapping.

Another example involves the treatment of null values. Most Java data types support null values, whereas most CORBA IDL data types do not. As a result, data types that might otherwise map to one another cannot do so absent some method of handling null values at run-time.

Although we will discuss in considerable detail the problems with mapping Java interfaces to CORBA IDL, these problems are not restricted to CORBA IDL and Java. For example, some languages such as ML support type parameterization for generic programming, while others such as C++ support generic programming by representing generic structures using templates that must be instantiated to specific types before they are used. Run-time mapping between these structures may be required for interoperation.

As used in this document:

The term object means any software-defined computing entity.

The term client means any object that requests any service from another object.

The term server means any object that provides any service in response to a request from another object.

The term notation means any computer language or representation scheme that may be used to define or represent an interface of an object.

The term interface means any specification of the communication between two objects.

The term statically defined data structure means a data structure comprising one or more data types defined at compile-time, the types being incapable of variation during run-time.

The term dynamic data type means a data element comprising a data type that may varied at run-time.

SUMMARY OF THE INVENTION

In one aspect, the present invention comprises a method for a client invoking on an interface defined in a first notation to invoke an object having at least one interface defined in a second notation comprising the steps of: automatically generating an intermediate object that receives a first message from a first object; the message representing at least one data structure; the at least one data structure comprising at least one dynamic data type; the intermediate object converting the representation of the at least one data structure and at least one data type into a representation of at least one statically defined data structure; the intermediate object sending a second message to a second object; the second message comprising the representation of the at least one statically defined data structure. The first object may be a server object and the second object a client object, in which case the first message is preferably a response to an invocation by the client object. Alternatively, the first object may be a client object and the second object may be a server object, in which case the first message is preferably an invocation by the client.

In a related aspect, the present invention comprises a method for a client invoking on an interface defined in a first notation to invoke an object having at least one interface defined in a second notation comprising the steps of: automatically generating an intermediate object that receives a first message from a first object; the message representing at least one statically defined data structure; the intermediate object converting the representation of the at least one statically defined data structure into a representation of at least one data structure comprising at least one dynamic data type; the intermediate object sending a second message to a second object; the second message comprising the representation of the at least one data structure and at least one dynamic data type. Here, too, the first object may be a server object and the second object a client object, in which case the first message is preferably a response to an invocation by the client object. Alternatively, the first object may be a client object and the second object may be a server object, in which case the first message is preferably an invocation by the client.

In still another aspect, the invention comprises a method for a client invoking on an interface defined in a first notation to invoke an object having at least one interface defined in a second notation comprising the steps of: automatically generating an intermediate object that receives a first message from a first object; the message representing at least one data structure; the at least one data structure comprising at least one null-capable element defined to be able to represent a null value; the intermediate object checking the null-capable element for a null value and converting the representation of the at least one data structure into a representation of a data structure having at least one null-incapable element corresponding to the at least one null-capable element; the at least one null-incapable element defined to be unable to represent a null value; the intermediate object sending a second message comprising data to a second object; the second message representing either a legal non-null value or an error signal.

In another aspect, the invention comprises a method for a client invoking on an interface defined in a first notation to invoke an object having at least one interface defined in a second notation comprising the steps of: providing a set of default rules for generating one or more interface definitions in the second notation from at least one interface defined in the first notation; receiving a set of default-override declarations for associating one or more non-default interface definitions in the second notation with at least one interface defined in the first notation; receiving a set of interface definitions in the first notation; for each received interface definition: determining whether the received interface definition corresponds to a default-override definition and if not, generating an interface definition based on the set of default rules. In one preferred embodiment, the at least one null-capable element comprises a string.

In one preferred embodiment of the invention, the first notation comprises CORBA IDL and the second comprises Java. In another preferred embodiment, the first notation comprises Java and the second notation comprises CORBA IDL.

In various preferred embodiments, the at least one statically-defined data structure preferably comprises a list, a struct, or a string, and the at least one dynamic data type preferably comprises a vector.

The methods described above may preferably be stored as data representing one or more computer programs implementing those methods on a computer-readable medium.

DESCRIPTION OF THE PREFERRED EMBODIMENTS

The preferred embodiments of the present invention comprise a series of methods and systems for invoking Java EJBs using a CORBA interface, and for invoking CORBA interfaces from Java EJBs.

General-purpose mappings have been defined from CORBA IDL and Java, and from Java to CORBA IDL. because CORBA IDL was designed specifically to map to a variety of languages, most. CORBA IDL interfaces map in a straightforward way to a corresponding Java interface. The opposite is not true. The IDL produced by the Java-to-IDL mapping s often difficult for CORBA objects to use due to the clumsiness of the Java-to-IDL mapping. As a result, the IDL, produced often contains Java-like types of private methods that are of no benefit to a non-java object and are extremely difficult to implement; thereby greatly hindering the integration between Java/EJB servers and CORBA clients. The deficiency in the Java-to-IDL mapping can be further illustrated using the following simple example.

Problems With the Java-To-IDL Mapping—an Example

The example below is one of the simplest "getting started" examples from Sun Microsystems' Java™ 2 Enterprise Edition Developers Guide (v. 1.2.1). The example defines an EJB interface of a shopping-cart EJB object. The three operations (methods) defined in the interface allow us to add and remove books by title from our shopping cart, and get the contents of the cart as a vector of title strings.

```
import java.util.*;
import javax.ejb.EJBObject;
import java. rmi.RemoteException;
public interface Cart extends EJBObject
{
public void addBook (String title) throws RemoteException;
public void removeBook(String title) throws BookException,
RemoteException;
public. Vector getContents () throws RemoteException;
}
```

Below is a manually defined IDL interface that achieves the same functionality as the EJB interface. This IDL interface will be compared with the IDL interface generated by the Java-to-IDL mapping.

```
//
// Custom IDL interface for Cart EJB
//
// Use wstring to support international strings.
typedef wstring TitleType; typedef sequence<TitleType> TitleSeq;
exception BookException { string message; } ;
interface Cart
{
```

```
-continued void addBook (in TitleType title);
void removeBook(in TitleType title) raises BookException;
readonly attribute TitleSeq contents;
};
```

Some sample code segments are shown below to demonstrate the usage of this IDL interface. From these samples we can see that this IDL interface is just as simple for a Java client to use as the EJB, with the added benefit that a non-Java client can also use it.

```
//
// C++ CORBA client
//
Cart_var my_cart = // find cart object somehow
my_cart->addBook("Moby Dick");
TitleSeq_var contents = my_cart->contents ();
for (int i = 0; i < contents->length (); ++i)
{
cout << "Cart contains: " << contents [i] << endl;
}
//
// Java CORBA client
//
Cart myCart = // find cart object somehow
myCart.addBook("Moby Dick");
String [] contents = myCart.contents ();
for (int i = 0; i < contents.length; ++i)
{
System.out.println ("Cart contains: "+contents [i]);
}
```

The IDL interface obtained from the standard Java-to-IDL mapping (by executing rmic compiler in the JDK) for this simple example is show below.

```
//
// Standard Java-to-IDL mapping of Cart
//
interface Cart: ::javax: :ejb: :EJBObject
{
void addBook (
in ::CORBA::WStringValue arg0);
void removeBook (
in ::CORBA::WStringValue arg0) raises (
BookEx);
readonly attribute : :java::util: :Vector contents;
};
```

From the mapping we identify the following problems:

The Pervasive Use of Valuetype

The first thing to note is the pervasive use of valuetype, such as the WStringValue. According to the standard Java-to-IDL mapping, anything more complicated than a simple numeric in Java RMI maps to a valuetype in CORBA IDL. Even a simple Java string maps to a value box containing a CORBA wide string. If we use an early CORBA version (CORBA 2.2 or earlier) which does not fully support valuetype, then the standard Java-to-IDL mapping is of no use at all. CORBA 2.3 introduced valuetype to IDL to allow passing of "objects by value." The introduced valuetype supports public and private data members, operations, initializers, and inheritance much like a class in C++ or Java. Moreover, unlike an IDL interface, a valuetype does not represent a remote object. Instances of a valuetype are passed by value, meaning the data members are transmitted and copy is created at the other end. This further means that if a valuetype has operations, the receiver must provide an implementation for each. For example, a client written in C++ needs a class to implement the operations and a factory class to create instances of the implementation. (Note that although in an all-Java world operation implementations can be downloaded, interferes with non-Java interoperability.)

If a valuetype has only data members then the IDL compiler automatically generates an implementation with accessors and modifiers. A value box is a special case with exactly one public data member. The Java-to-IDL mapping often uses value boxes because they can have null values (as can most Java types) whereas non-valuetype IDL data types cannot.

The Collections Problem

Assuming our ORB does support valuetype, the interface above looks simple enough. But what is the IDL mapping for a ::java::util::Vector to a non-Java client? The standard mapping gives us two choices: data-only, or data plus methods.

If we take the data-only mapping (by using the -no Value Methods option in the rmic compiler) we obtain the following:

```
// IDL
valuetype Vector: ::java::util::AbstractList, ::java::util::List
supports ::java::lang::Cloneable {
private long capacityIncrement;
private long elementCount;
private ::org::omg::boxedRMI::java::lang::seq1_Object
elementData;
};
```

There are several things wrong with this as a language-independent way of representing a collection of strings.

No type safety: elementData (after following a trail of typedefs) is a sequence of the IDL any type. This means each element could be of any IDL type whatsoever. The client can discover at run time that they are all in fact strings, but it's a lot of extra client effort given that we knew this at interface design time.

Performance penalty: Type description information is sent for each element individually because, although we know in practice they are all strings, as far as the ORB is concerned each element could be a different type.

What do capacityIncrement and elementCount mean? These are private members of Java's vector class—in other words, implementation details. To find out what they mean we have to look at the implementation notes for java.util.Vector. It turns out that elementCount indicates how many elements of the sequence are relevant, something that a CORBA programmer will not expect (since a sequence is already a vector.) This is too much Java-specific detail for a non-Java client—in fact it's even too much for a Java client.

What does all the inheritance mean? Nothing. AbstractList, List and Cloneable are empty interfaces that exist purely to preserve a Java inheritance hierarchy. This is of no interest to a non-Java client.

The Private Data Problem

The next problem for the client is the fact that all these data members are private and there are no public accessors. In order to get access we need some public methods. There are three options, none terribly appealing:

1. Hand-modify the data-only mapping above to make the members public. We'll need to automate this in a large system.

2. Cheat using some language-specific trick. For example in C++ you can write a valuetype implementation with public C++ methods that are not part of the valuetype interface, and use dynamic casting to get at those methods.
3. Use the data-plus-methods mapping described below.

The "Spaghetti Effect"

Since the data-only mapping creates a problem with private data members, let's consider the data-plus-methods mapping. This produces a similar set of valuetypes, but instead of just data they also contain all the methods of the Java classes they were mapped from.

The first problem with this is that the client has to implement those methods, and there can be a lot of them. The second, and more serious, problem is that mapping the methods involves mapping all the classes used as parameter types to those methods. These additional classes have their own methods that must be mapped, and those methods introduce further parameter types, and so on recursively. The Java-to-IDL mapping document refers to this as the "spaghetti effect." As a result, a surprisingly large amount of the Java language is dragged into IDL through recursive dependencies. The client-side problem of implementing all these valuetypes is made drastically worse, to the point where it is generally not realistically feasible to use the value-plus-methods mapping.

Our example nicely illustrates the impact of this effect. A total of 27 IDL files (each containing a single valuetype declaration) are produced from this simple example. As a result, our client (who only wants a few strings) must implement the 22 methods declared by the Vector type and the 11 inherited from AbstractList, List and Cloneable. Most can be empty implementations, but they must be implemented. The client probably won't need to implement the 10 other non-abstract valuetypes that are dragged in from java.lang, java.io and javax.ejb by the spaghetti effect, but they will have to link in all the relevant stub code from the IDL compiler.

Summary of Problems With the Mapping

The general problems exposed in the example above are summarized as follows:

Valuetypes are everywhere: valuetypes were added in CORBA 2.3 and there are still many ORBs in use that do not support them. Some OMG language bindings (for example COBOL) may never support them. They are a complex addition to IDL (some would say overly complex) and developers concerned with inter-operability across a wide range of platforms may wish to avoid them.

Collections: Java programmers typically use collections of Object because Java lacks features (like C++ templates or Ada generics) to define strongly typed collections. Mapping such collections creates weakly typed interfaces that make life difficult for clients, and impose a performance penalty.

Implementing valuetypes: The client is stuck with providing valuetype implementations—lots of them. Using the data-only mapping, the IDL compiler can do most of the work, but then the client has the problem of accessing private data members in valuetypes that have no operations.

Too Much Java: Mapping the utility classes that Java programmers normally use exposes too much Java in IDL, including private data members of Java classes and parts of the Java class hierarchy that are completely irrelevant to a non-Java client.

There are also some other problems that we did not discuss in our example:

Files and build management: The mapping produces large numbers of files in a deeply nested directory structure. This is natural for Java build environments, but not for other languages.

Split modules: Java packages map to multiple IDL modules that are deeply nested and re-opened in multiple files. CORBA IDL normally has a fairly flat module space with one file per module. Although technically allowed, re-opening a module in multiple files causes mapping problems for some languages—for example C++ compilers without namespace support.

Name mangling: The mapping sometimes mangles EJB method names in their IDL counterpart. Java features that lead to mangled names include overloaded methods, method names that match field or bean property names, names that differ only by case (IDL is not case-sensitive, whereas Java is), classes with same name as the containing package, and names using non ISO-Latin 1 characters. The mangling is not programmer-friendly for a client.

Exception mismatch: Java allows exception inheritance, IDL does not. To preserve the inheritance, Java exceptions are mapped to a valuetype inside a CORBA exception. This is a very abnormal paradigm for CORBA programmers, and it is not even useful for those languages that allow exception inheritance because in the mapped IDL it is not the exceptions but their contents that follow the Java hierarchy.

Using IDL to Define EJB Data Types

One technique for making an EJB easier for a CORBA client to use is to use CORBA IDL to define the data types used by the EJB. Let's take a step back to explain what we mean by this:

Remember we can map in both directions between IDL and Java. So far we have discussed the pitfalls of the Java-to-IDL mapping used by the standard CORBA to EJB inter-operability mechanism. However there is also the long-standing IDL-to-Java mapping which is the proven foundation for developing Java-based CORBA systems. The IDL-to-Java mapping is easy to use because IDL was explicitly designed to be mapped to programming languages like Java (the reverse is not true unfortunately.) This means that for any IDL type, there is a corresponding derived Java type under the IDL-to-Java mapping. The Java-to-IDL mapping makes a special case for these derived types. EJB parameters that are IDL-derived Java classes map to a value box containing the original IDL type they derived from. This means that if you start from an IDL type, you almost come back to where you started from. For example:

```
// IDL: Data type definition-
struct Customer {
    string name;
    string address;
}
// EJB: Interface using IDL-derived Customer class
interface Mailer extends EJBObject {
    void sendMail(Customer customer);
}
// IDL: Java-to-IDL mapping of EJB above
interface Mailer: : :javax: :ejb: :EJBObject {
    void sendMail(
        in : :org: :omg: :boxedIDL: :Customer customer
    );
}-
```

The ::org::omg::boxedIDL::Customer type is a value box: a simple wrapper that holds an instance of the original IDL Customer type. For client code, this is almost as easy to use as the original IDL type: provided the client ORB supports valuetype. The value box is introduced by the Java-to-IDL mapping to deal with null values. All Java class types allow null value, as do IDL valuebox types. Other IDL types, such as struct, do not.

Below is a checklist of CORBA-friendly techniques used to define CORBA-friendly EJB:

- Use IDL to define data types. As explained above, you can use IDL to define data types, then use the IDL-derived Java classes in your EJB. When you map the EJB back to IDL it will use value boxes containing the original IDL types. These are easier for the client to use than native Java types mapped to IDL.
- Use IDL to define exceptions. This is similar to using IDL to define data types as per the previous point. An IDL-derived exception in an EJB throws clause is mapped back to its original definition when in IDL under the Java-to-IDL mapping. This is the only way to avoid the valuetype-in-an-exception problem produced by the mapping.
- Use arrays, not collection classes: A Java array maps to a value box containing an IDL sequence of the corresponding type. This is preferable to a weakly typed sequence <any> locked away in the private data of a Java valuetype.
- Expose public data: If you do use non-IDL Java classes as data types, make the important members public so that the no-method mapping will be easy to use.
- Using java.lang.Object is ok from the mapping point of view; it maps to the IDL any type, which is a piece of self-describing data that your CORBA client can interpret at run-time. In terms of general design principles, you should be careful about using generic types like this because they can mask type consistency errors in your application until run-time that could have been caught during development.
- Avoid spaghetti: Use the no-value-methods mapping to avoid dragging useless Java classes into the IDL generated by the Java-to-IDL mapping. We don't recommend using the with methods mapping. Even in simple test cases it produces IDL that is too complicated to do much with, in a realistic application there is little or no hope of getting it working.

The above techniques will make things a little better for our CORBA clients, but valuetypes are still not eliminated. This is because according to the standard Java-to-IDL mapping, any type other than a the simple numeric types will be mapped to a valuetype in IDL, even one that was originally derived from an IDL data type.

Generating a CORBA-Friendly EJB from EJB-Friendly IDL

The list of restrictions suggested above would be difficult to follow manually for a large number of EJB interfaces. An alternative approach is to start by defining the remote interfaces for your EJB system entirely in IDL, and then derive the EJB interfaces from the Java mapping of those IDL interfaces. This will produce EJB interfaces that naturally follow the IDL-friendly rules.

The derived EJB interface will be almost identical to the "Operations" interface created by the IDL-to-Java mapping, with the following differences:

Have the interface extend javax.ejb.EJBObject

Add throws java.rmi.RemoteException to each operation signature.

A code generation script (for example using the Orbix Code Generation Toolkit) can automate the creation of EJB remote interfaces from the IDL file, so that you can define your IDL interfaces first and have your EJB interfaces generated automatically. Unfortunately, because the Java-to-IDL and IDL-to-Java mappings are not symmetrical, the reverse mapping of an interface created in this way will not be the IDL interface you started with. The following problems may emerge:

- All complex data types and strings will be wrapped with value boxes.
- Boxes for IDL types have deeply nested package names, for example omg::org::boxedIDL::MyDataType
- All string types become value boxes containing a wstring.
- The EJBObject inheritance is exposed in IDL.
- IDL out or inout parameters cause problems.

The last problem is the most severe. Java only supports the "in" style of parameter passing. In order to support IDL out and inout parameters, the IDL-to-Java mapping introduces Holder objects in Java. A Java ORB uses Holders to communicate the return value in out or inout parameters to the caller. Unfortunately Holders do not implement the Java Serializable interface, which means that the Java-to-IDL mapping does not treat them as data types. Instead it treats them as completely opaque abstract valuetypes, which means the client has no way to get access to the contained values.

The solution is to write "EJB-friendly IDL" using only in parameters. This straightforward restriction brings the IDL design model closer to the EJB model, which also allows only a single result to be returned from a call. Of course that result can be a struct containing multiple data fields, so we have not really lost any expressive power here.

The steps in this approach are summarized below:
1. Define interfaces initially in IDL, using only the in parameter passing mode and avoiding valuetype.
2. Derive EJB interfaces from the IDL by making minor modifications to the results of the IDL normally generated by the IDL-to-Java mapping. Code generation tools can automate this step.
3. Code our EJB to the EJB interface created in step 2.
4. Code our clients to the reverse-mapped IDL derived from the EJB interface of step 2.
5. Deploy the EJB, and deploy clients that communicate directly with the EJB via RMI/IIOP.

As we can see step 4 is a little awkward—ideally we would like to be able to code clients to the original IDL defined in step 2, rather than the reverse-mapped version, which introduces a variety of unpleasant side-effects. We can do this by building wrappers as described in the next section.

Building and Generating CORBA-EJB Wrappers

A CORBA-EJB wrapper is a CORBA object (implemented in Java) that delegates to an EJB. The advantage of a CORBA-EJB wrapper is that it is a normal CORBA object with a clean IDL interface that does not suffer the problems of the Java-to-IDL mapping.

In general you can handcraft wrappers that delegate to EJBs in any way you like but there is an important special case when you derive EJB interfaces from IDL interfaces as described above. In that case, the wrapper can implement the original IDL interface and delegate to the derived EJB. CORBA clients communicate with the original clean interface, and avoid the complexities introduced by the reverse mapping.

Because the wrapper and EJB interfaces are so closely aligned, the wrapper does not need to perform any manipulation of parameters or return values—it simply passes all parameters directly to the EJB, and returns the results directly to the client. There are only two situations where the wrapper needs to intervene:

EJB returns null value: This should be considered an error—a CORBA friendly EJB should not return null values. The wrapper can raise a system exception such as BAD_PARAM.

EJB throws RemoteException: The wrapper must catch this exception and convert it to an appropriate CORBA system exception. Most of the RemoteExceptions defined by the JDK have obvious CORBA counterparts, and the UNKNOWN exception provides a fallback for unknown extensions to RemoteException.

Each wrapper operation will look something like this:

```
ReturnType some op (ParameterType p1, ...) {
try{
ReturnType result = m_ejbTarget.some_op (p1, ...);
if (result == null) throw new BAD_PARAM();
} catch (RemoteException ex) {
throw_corba_system exception for (ex);
}
}
```

Since the wrappers are so predictable and simple, we can use another code generation script to create them from the IDL automatically. Now our procedure for interoperating EJB and CORBA is summarized as follows:

1. Define interfaces initially in IDL, using only the in parameter passing mode and avoiding valuetype.
2. Generate EJB interfaces from the IDL, code your EJB to these interfaces.
3. Generate wrappers from the IDL.
4. Code your clients to the Original IDL from step 1.
5. Deploy the EJB and wrappers, deploy clients that talk to the wrappers using IIOP while the wrappers talk to the EJB using RMI or RMI/IIOP.

A Wrapper Framework

CORBA wrappers for an EJB will need a CORBA server to live in, regardless of whether they are generated automatically or coded by hand. For a given EJB we need:

Object wrapper interface: IDL interface representing the EJB's remote interface. As we have discussed above, the EJB could actually be derived from the IDL.

Home wrapper interface: IDL interface representing the EJB's home interface. This corresponds to a CORBA "factory." We can derive the EJBHome interface from IDL just as we discussed for the object interfaces.

There will be a single instance of the home wrapper, and potentially many instances of the object wrapper, reflecting the situation with the corresponding EJB interfaces. We must design a CORBA server that can efficiently implement these wrapper objects with predictable memory requirements and as little overhead as possible. We also need to consider how wrappers for multiple types of EJB are deployed into such a server.

The Wrapper Container Server

All wrappers require the same kind of server environment to run in, so we can build a generic "wrapper container" server to host wrappers. This can be implemented as a normal Java/CORBA server using any CORBA 2.3 compliant Java ORB. In this case the set of wrappers that is available will be determined at start-up, either by being hard-coded into the server mainline or read from some server configuration file.

A more interesting approach is to allow dynamic deployment of wrappers into a running container server. We can implement an IDL container interface that provides a deploy operation to allow new wrapper code to be deployed at runtime. Since the code is always Java, deploy( ) can accept Java byte-code archives containing the necessary wrapper code. If the wrapper code is always available locally it could also take file system pointers or even just class names available on the local class path. This is much closer to the EJB model, and allows greater flexibility around deployment.

The most interesting approach is to embed the wrapper server inside the application server to reduce the remote communication between wrappers and their targets. This depends on use of non-standard application server hooks, so it may not be possible with all application servers. IONA Technologies' iPortal Application Server is built on top of a pluggable CORBA ORB, so a wrapper container can be loaded dynamically as an ORB plug-in and thus become part of the application server.

Regardless of where the container server runs, it preferably knows the following information about each wrapper that is deployed. This information forms a kind of "deployment descriptor:"

Java servant classes to implement the IDL home and object wrapper interfaces
The IDL interface type of the wrappers
The JNDI name of the EJB Home object
The CosNaming name to use for the IDL Home wrapper object
Whether the wrapped EJB is an Entity Bean or a Session Bean Using this information, the container server can set up object adapters, create wrapper servants, and advertise both the CORBA home wrapper and the naming service. A wrapper developer need only implement the wrappers themselves and deploy them into the container.

From the client perspective, CORBA clients use the CORBA naming service to locate the IDL Home wrapper. They use the home wrapper to create or look-up object wrappers just like EJB clients use an EJB home to locate EJB objects.

Inside the Container Server

Having outlined what the container server does, let's look at how we can implement it efficiently using the Portable Object Adapter (POA) provided by CORBA. From a client perspective, wrappers have a one-to-one relationship with the EJB objects they wrap. We must implement this relationship with limited memory, even though there may be an unlimited number of EJB objects.

For each EJB type there is a single EJB home instance and therefore a single home wrapper instance. We can implement the home object as follows:

1. At deployment, locate the target EJB Home via JNDI and create a home wrapper servant that delegates to that EJB home.
2. Activate the servant in the Home POA. The POA can be multi-threaded since the wrapper simply delegates to a thread-safe EJB Home object.
3. Publish the home wrapper reference in the CORBA naming service using the name provided at deployment.

Figure 1:
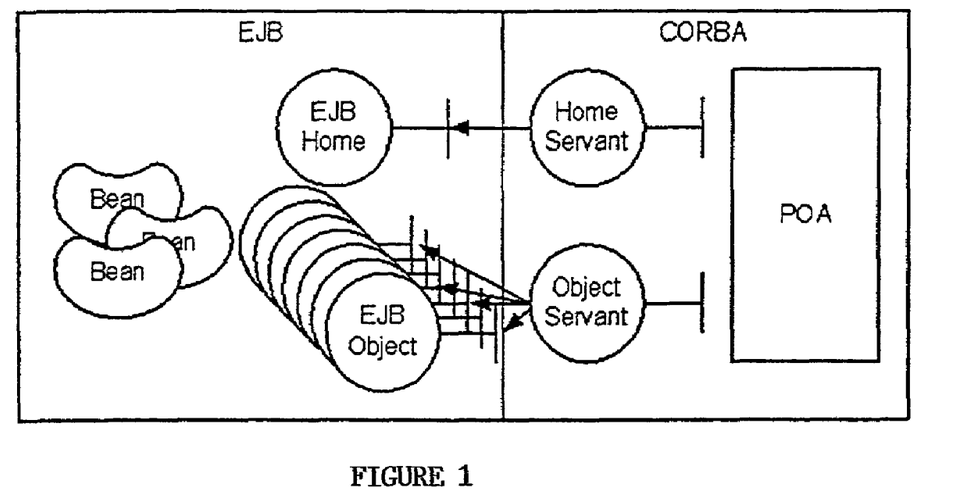
FIG. 1 schematically illustrates an example preferred system using a CORBA object wrapping an EJB home interface, and a single CORBA object wrapping the remote interfaces of a plurality of EBJ objects.

EJB object wrappers may be more numerous. There may be a very large number of EJB objects representing entities in a huge database. There may be a rapidly changing collection of EJB objects representing client sessions that are created and destroyed. EJB handles this by using a small pool of Beans to implement a large number of EJB objects, swapping beans between instances as needed. The POA offers an even better solution: we can implement all the CORBA wrapper objects using one stateless, multi-threaded, multiple-identity CORBA object. The resulting system is schematically illustrated in FIG. 1.

With the help of the Home wrapper, a servant locator (one of the standard POA tools), the EJB Object wrapper is generated as follows:

1. Create the home wrapper object.
2. The home wrapper object creates a single instance of the object wrapper servant and a CORBA object reference for the object wrapper servant. Part of every CORBA reference is an ObjectId that can be chosen by the application. The home wrapper object encodes the identity of the EJB Object (a serialized Handle) and the corresponding IDL interface (a Repository ID) in the ObjectId and publishes the object reference in the servant locator.
3. A servant locator lets us control which servant receives each CORBA request. Our wrapper servant locator has a map of deployed wrapper interfaces and their corresponding servants. For each incoming request, it extracts the wrapper interface from the ObjectId and chooses the appropriate object wrapper servant.
4. The object wrapper servant itself finds out what ObjectId was used to make the call (using PortableServer::Current) and extracts the EJB Handle to find the target EJB Object.
5. The object wrapper servant delegates the call to the target. Note it must deal with the possibility that the target does not exist by catching java.rmi.NoSuchObjectException and throwing CORBA::NON_EXISTENT.

We register the servant locator with a multi-threaded POA to avoid a bottleneck on access to EJB objects. We don't need any synchronization because the servants do nothing but delegate to a thread-safe EJB object. We will need two separate POAs, one with the TRANSIENT policy for Sessions and one with PERSISTENT policy for Entities. Implementing the above approach requires knowledge of CORBA 2.3 and J2EE specifications, which are available from the Object Management Group and Sun Microsystems, respectively, and are incorporated herein by reference.

The implementation proposed above has the following desirable properties:

A small, fixed number of POAs (Home, Session and Entity) can handle an arbitrary number of EJB types.

Memory consumption is proportional to the number of types of EJB, and independent of the number of instances.

Servant locator and POA configuration code is generic, only the mapping code in the servants depends on the interfaces.

Although the specific embodiments described above are described in the context of CORBA/EJB integration, this description is not intended to be limiting.

What is claimed is:

1. A computer implemented method for a client invoking on an interface defined in a first notation to invoke an object having at least one interface defined in a second notation comprising the steps of:
   automatically generating an intermediate object that receives a first message from a first object, wherein the first message is at least one of an invocation and an response to an invocation;
   the first message representing at least one data structure;
   the at least one data structure comprising at least one dynamic data type, said dynamic data type defining a data element comprising a data type that is variable at run-time;
   the intermediate object converting the representation of the at least one data structure and the at least one dynamic data type into a representation of at least one statically defined data structure, said statically defined data structure defining one or more data types that are defined at compile-time and are incapable of being varied during run-time;
   the intermediate object sending a second message to a second object; and
   the second message comprising the representation of the at least one statically defined data structure.

2. The computer implemented method of claim 1 wherein: the first object is a server object;
   the second object is a client object; and
   the first message is the response to the invocation by the client object.

3. The computer implemented method of claim 1 wherein: the first object is a client object;
   the second object is a server object; and
   the first message is the invocation by the client object.

4. A computer implemented method for a client invoking on an interface defined in a first notation to invoke an object having at least one interface defined in a second notation comprising the steps of:
   automatically generating an intermediate object that receives a first message from a first object, wherein the first message is at least one of an invocation and a response to an invocation;
   the first message representing at least one statically defined data structure, said statically defined data structure defining one or more data types that are defined at compile-time and are incapable of being varied during run-time;
   the intermediate object convening the representation of the at least one statically defined data structure into a representation of at least one data structure comprising at least one dynamic data type, said dynamic data type defining a data element comprising a data type that is variable at run-time;
   the intermediate object sending a second message to a second object; and
   the second message comprising the representation of the at least one data structure and at least one dynamic data type.

5. The computer implemented method of claim 4 wherein: the first object is a server object;
   the second object is a client object; and the first message is the response to the invocation by the client object.

6. The computer implemented method of claim 4 wherein: the first object is a client object;
   the second object is a server object; and
   the first message is the invocation by the client object.

7. A computer implemented method for a client invoking on an interface defined in a first notation to invoke an object having at least one interface defined in a second notation comprising the steps of:
   automatically generating an intermediate object that receives a first message from a first object, wherein the first message is at least one of an invocation and a response to an invocation;
   the first message representing at least one data structure;
   the at least one data structure comprising at least one null-capable element defined to represent either of: a non-null or a null value;
   the intermediate object checking the null-capable element for a null value and convening the representation of at least one data structure into a representation of a data structure having at least one null-incapable element corresponding to the at least one null-capable element;

the at least one null-incapable element defined to be restricted from representing a null value;

the intermediate object sending a second message to a second object; and the second message comprising data representing either a non-null value or an error signal.

8. The computer implemented method of claim 7 where the at least one null-capable element comprises a string.

9. The computer implemented method of claims 1, 2, 3, 4, 5, 6, or 7, wherein the first notation comprises CORBA IDL and the second notation comprises Java.

10. The computer implemented method of claims 1, 2, 3, 4, 5, 6, or 7, wherein the first notation comprises Java and the second notation comprises CORBA IDL.

11. The computer implemented method of claims 1, 2, 3, 4, 5 or 6 wherein the at least one statically-defined data structure comprises a list.

12. The computer implemented method of claims 1, 2, 3, 4, 5 or 6 wherein the at least one statically-defined data structure comprises a string.

* * * * *

UNITED STATES PATENT AND TRADEMARK OFFICE
CERTIFICATE OF CORRECTION

| | |
|---|---|
| PATENT NO. | : 7,472,399 B2 |
| APPLICATION NO. | : 10/133849 |
| DATED | : December 30, 2008 |
| INVENTOR(S) | : Alan Conway |

Page 1 of 1

It is certified that error appears in the above-identified patent and that said Letters Patent is hereby corrected as shown below:

Column 14, line 34, delete "convening" and insert --converting--.
Column 14, line 66, delete "convening" and insert --converting--.

Signed and Sealed this

Fourteenth Day of April, 2009

JOHN DOLL
*Acting Director of the United States Patent and Trademark Office*